United States Patent [19]

Schmitz et al.

[11] Patent Number: 4,623,921
[45] Date of Patent: Nov. 18, 1986

[54] ANTENNA DIPLEXER UTILIZING AURAL INPUT FOR VISUAL SERVICE

[75] Inventors: Anthony N. Schmitz, Mount Laurel; Joseph J. Matta, Marlton, both of N.J.

[73] Assignee: General Signal Corporation, Stamford, Conn.

[21] Appl. No.: 739,431

[22] Filed: May 30, 1985

[51] Int. Cl.⁴ .................... H04N 7/04; H04N 5/38; H04J 5/15
[52] U.S. Cl. .................................... 358/143; 358/186; 358/198; 370/69.1; 370/37; 455/293; 333/21 A; 333/135; 343/771
[58] Field of Search ............... 358/141, 142, 143, 144, 358/146, 186, 197, 198; 370/69.1, 37; 455/106, 109, 124, 129, 293; 333/21 A, 135; 343/771, 5 SW

[56] References Cited

U.S. PATENT DOCUMENTS

| | | | |
|---|---|---|---|
| 4,240,155 | 12/1980 | Vaughan | 370/69.1 |
| 4,310,854 | 1/1982 | Baer | 358/143 |
| 4,397,037 | 8/1983 | Theriault | 455/293 |
| 4,491,871 | 1/1985 | Schmitz et al. | 358/186 |
| 4,590,479 | 5/1986 | Ben-Dow | 343/771 |

Primary Examiner—James J. Groody
Assistant Examiner—Michael D. Parker
Attorney, Agent, or Firm—Robert R. Hubbard

[57] ABSTRACT

A television broadcasting system uses an antenna diplexer to combine signals generated from visual and aural power amplifiers. The diplexer comprises first and second hybrids coupled together by transmission lines which have aural-frequency cavities for reflecting aural energy from an aural input port to an antenna output port of the second hybrid. In the event that the visual power amplifier fails, it is desirable to revert to multiplexed operation, in which the aural power amplifier amplifies a combined visual and aural signal. This mode of operation is accomplished by combining the low-level aural signal with the low-level visual signal, by putting the combined visual-with-aural multiplexed signal through the aural power amplifier, and by simultaneously shorting the transmission lines between the second hybrid and the aural cavities.

14 Claims, 7 Drawing Figures

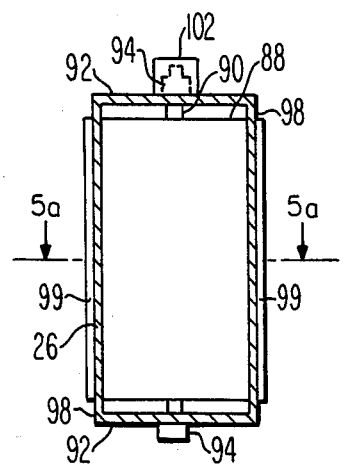
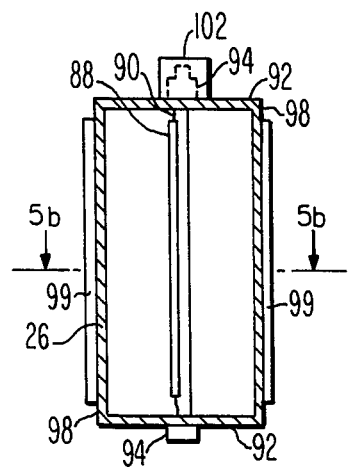
Fig. 4a                Fig. 4b
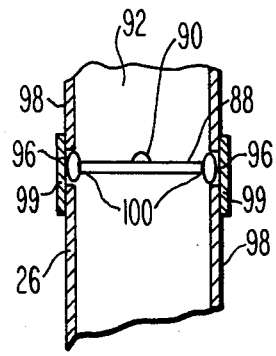
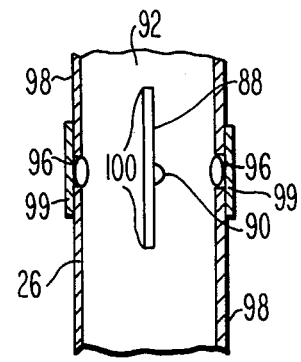
Fig. 5a                Fig. 5b ing to broadcast antennas. Such transmitters for television use may be capable of generating hundreds of kilowatts of visual signal energy within the television band. The aural carrier signal power is typically about 10 dB down from the peak visual carrier energy.

ANTENNA DIPLEXER UTILIZING AURAL INPUT FOR VISUAL SERVICE

BACKGROUND OF THE INVENTION

This invention pertains to a system for coupling signals to a transmitting antenna from a source of television video signals and an associated source of audio signals in which separate visual and aural power signals are diplexed together for application to the antenna but in which the aural signal can be multiplexed with the visual carrier and switched through the aural power amplifier in the event of failure of the visual power amplifier.

Broadcast television transmitters are used to generate high-power modulated signals for application to broadcast antennas. Such transmitters for television use may be capable of generating hundreds of kilowatts of visual signal energy within the television band. The aural carrier signal power is typically about 10 dB down from the peak visual carrier energy.

In one form of transmitter, the aural carrier is FM-modulated onto a 4.5 MHz carrier. The FM-modulated aural carrier is combined with baseband video, and the combined signal is amplitude-modulated onto the final carrier. Amplifiers are used to raise the power level of the combined visual-aural signal to the desired level. Another form of transmitter AM-modulates the visual carrier onto an IF signal and FM-modulates the aural carrier onto an IF signal displaced in frequency from the first IF signal by the desired final difference between visual and aural carriers, combines the two signals, AM modulates the combined signal, and amplifies the composite signal. In yet another type of transmitter, a high-power oscillator tube amplitude modulates the combined visual and FM-modulated aural signals. All of these configurations have combined visual and aural signals passing through a high-power active device. As is well known, active devices are subject to nonlinearities of both amplitude and phase which lead to a multitude of undesirable intermodulation products. These products must be kept to a low level either by reducing the power output of the active device or by filtration. Filtration, however, cannot adapt to the various intermodulation products, which vary with signal level. As a result, the transmitter arrangements in which both aural and visual signals pass through power active devices tend to be limited in power output.

It is known to overcome the above-mentioned limitations by keeping the visual and aural carriers separate through the active devices, and then combine the two separate high-power signals in a passive linear combiner. In such diplexed arrangements, one active device (or one set of active devices) produces the high-power modulated visual carrier and another produces the high-power aural signal. These are combined by a linear diplexer. A known form of diplexer consists of two 3 dB, 90° four-port couplers, two ports of each of which are coupled together by transmission lines. A further port of each hybrid is coupled to a source of high-power carriers (one to the visual, one to the aural). On the hybrid, to which the visual carrier is coupled, the fourth port is terminated. On the hybrid, to which the aural carrier is coupled, the fourth port is the combined output port at which the linearly combined visual and aural carriers appear, and this port is normally coupled to the antenna. The transmission lines, coupling together two ports of each hybrid, are also coupled to transmissionline filters, including one tuned to 3.58 MHz below the visual carrier for preventing the lower-sideband visual-carrier-color-subcarrier intermodulation product from reaching the antenna, and another tuned to the aural carrier frequency for causing the reflections necessary to couple the aural carrier input port of the second hybrid to the antenna port. In such diplexers for UHF TV use manufactured by Micro Communications, Inc., located at Grenier Field, Manchester, N.H., the transmission-line filters are short-circuited circular waveguide. In another such diplexer manufactured by RCA Corporation, Gibbsboro, New Jersey, the transmission-line filters are short-circuited rectangular waveguide.

For television transmitters of the diplexed type, if the high-power aural carrier active device or aural power amplifier fails, transmission of the visual carrier without aural carrier results. To overcome this situation, it is desirable to be able to revert to the less desirable multiplexed operation from the more desirable diplexed operation in the event of failure of the aural power amplifier. In the past, this has been accomplished by coupling the low-level FM-modulated aural carrier with low-level visual information and applying the combination to the visual power amplifier, and at the same time bypassing the diplexer by means of high-power switch circuits. The low-level combining circuits are not a great problem, but the switching of the high-power signal requires very elaborate and expensive switches and circuits, or temporary shutdown of the still-operating high-power visual sections so as to be able to throw switches. U.S. Pat. No. 4,491,871 which issued to A. N. Schmitz and R. N. Clark on Jan. 1, 1985, describes an arrangement in which the aural signal can be multiplexed without high-power switching in the event of failure of the aural power amplifier by simultaneously detuning the aural cavities in the diplexer in order to allow the aural-multiplexed visual carrier to pass through the diplexer.

If the visual power amplifier fails, transmission of the aural carrier without visual carrier results. To overcome this situation, it is desirable to be able to revert to the multiplexed operation in the event of failure of the visual power amplifier, whereby the aural power amplifier can be substituted for visual service. However, wheh using the aural power amplifier for visual service, the rf (radio frequency) energy must be switched to bypass the antenna diplexer. The present invention provides an arrangement in which the aural power amplifier can be used for visual service without high-power switching circuitry.

SUMMARY OF THE INVENTION

With the present invention, a notch diplexer utilizes its aural input for visual service when the visual power amplifier fails so that the aural-multiplexed visual carrier can then be put through the aural power amplifier to the aural input of the notch diplexer, thereby eliminating expensive bypass switching circuitry. Specifically, the present invention comprises a diplexed television transmitter having visual and aural power amplifiers and an antenna diplexer having first and second hybrids coupled together by transmission lines, which have aural-frequency cavities for reflecting aural energy from an aural input port to an antenna output port of the second hybrid. Multiplexed operation is accomplished by combining the low-level aural signal with the low-level visual signal, by putting the combined visual-with-aural multiplex signal through the aural power amplifier, and by simultaneously shorting the transmission lines between the second hybrid and the first hybrid.

BRIEF DESCRIPTION OF THE DRAWINGS

FIGS. 4a and 4b are partial cross-sectional views taken along line 4—4 of FIG. 2 illustrating the preferred embodiment at different operating positions.

FIGS. 5a and 5b are cross-sectional views taken along lines 5a and 5b, respectively, of FIGS. 4a and 4b.

DETAILED DESCRIPTION OF THE PREFERRED EMBODIMENT

Figure 1:
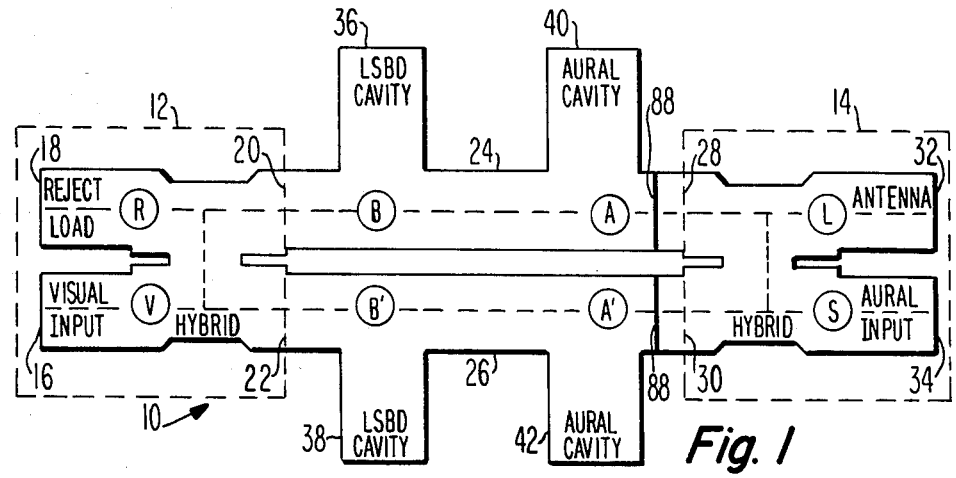
FIG. 1 is a simplified block diagram of a UHF waveguide notch diplexer for utilizing the present invention.

FIG. 1 of the drawings shows a UHF waveguide notch diplexer 10 used for combining outputs from both a visual transmitter and an aural transmitter into a single channel for transmission to a single antenna without permitting either transmitter to feed appreciable energy to the other. The antenna diplexer 10 comprises two 3 dB, 90° four-port waveguide hybrids 12 and 14. The first hybrid 12 has a first port 16 which is adapted for coupling to a visual power amplifier (not shown) and a second port 18 adapted for coupling to a matched load or termination (not shown). Third and fourth ports 20 and 22 of the first hybrid 12 are coupled to first and second waveguide transmission lines 24 and 26, respectively. The transmission lines 24 and 26 are in turn coupled to first and second ports 28 and 30 of the second hybrid 14. A third port 32 of the second hybrid 14 is adapted for coupling to an antenna or other utilization device (not shown), and a fourth port 34 is adapted for coupling to an aural power amplifier (not shown). A pair of short-circuited LSBD (Lower Side BanD) cavities 36 and 38 are coupled to the transmission lines 24 and 26, respectively. Also coupled to the transmission lines 24 and 26 are aural cavities 40 and 42, respectively. The LSBD cavities 36 and 38 and the aural cavities 40 and 42 comprise short-circuited transmission lines.

In operation, a visual power signal generated by the visual power amplifier is applied to the first port 16 of the first hybrid 12, at point V, and is divided equally through the two branches of the first hybrid 12, half of the signal power flowing to the third port 20 and half to the fourth port 22. This visual power signal typically is a color signal modulated onto a first carrier and includes a color subcarrier at a frequency offset from the frequency of the first carrier. As a result of the hybrid action, the signals at the third and fourth ports 20 and 22 are 90° out-of-phase at the carrier frequency. The visual power signals flowing to the right through the transmission lines 24 and 26 are coupled to the LSBD cavities 36 and 38, which are tuned to 3.58 MHz, for NTSC (National Television Standards Committee), below the visual carrier frequency. This is the frequency at which undesirable intermodulation products tend to appear in the visual signal due to the action of the unavoidable nonlinearities in the power output stages of the visual power amplifier on the principal signal components of a color television signal. For a transmitter operating in a PAL (Phase-Alternation Line) System, the LSBD cavities 36 and 38 would be tuned to 4.43 MHz below the visual carrier frequency. At the frequency- of these undesired intermodulation products, the LSBD cavities 36 and 38 effectively present a short circuit to the transmission lines 24 and 26 at points B and B' and, as a result, the intermodulation products are reflected from points B and B' back through the first hybrid 12, in which they undergo a second 90° relative phase shift. Those intermodulation products reflected back to the first (visual input) port 16, at point V, arrive 180° out-of-phase and cancel, while they arrive in-phase at the second (reject load) port 18, at point R, and are absorbed by the load. Thus, the lower sideband cavities 36 and 38 so do not change the visual power signal at the first (visual input) port 16 and therefore are isolated from the visual power ampifier.

That portion of the visual power signal which is in the principal portion of the channel is not affected by the LSBD cavities 36 and 38, and therefore continues to propagate to the right through the transmission lines 24 and 26 and past the aural cavities 40 and 42 to the first and second ports 28 and 30 of the second hybrid 14. The aural cavities 40 and 42 do not affect the visual power signal because they are tuned to present a short circuit at the aural carrier frequency, i.e., at a frequency above the visual power signal frequencies, and the circuit constants are selected such that the aural cavities 40 and 42 act as parallel resonant circuits at the visual carrier frequencies. The visual power signals arriving at the first and second ports 28 and 30 are coupled together in-phase at the third port 32, at point L, and 180° out-of-phase at the fourth port 34, at point S, and therefore the visual energy couples to the antenna but is isolated from the aural power amplifier.

An aural power signal generated by the aural power amplifier is applied to the fourth port 34 of the second hybrid 14 and is divided into two portions, one of which propagates to the left along the second transmission line 26 from the second port 30 and another of which is propagated to the left in the first transmission line 24 from the first port 28 with a 90° phase shift relative to the phase of the signal propagated in the transmission line 26. The aural power signals are coupled to the aural cavities 40 and 42, which are tuned to effectively present a short circuit at points A and A'. The aural energy is reflected back to the right, and passes through the second hybrid 14 a second time, adding in-phase at the third (antenna) port 32, at point L, and out-of-phase at the fourth (aural input) port 34, at point S. As earlier noted, the aural cavities 40 and 42 are also adjusted to present a high impedance to the transmission lines 24 and 26 at the visual carrier frequency, so do not affect the flow of visual power. When the diplexer 20 is properly balanced, aural and visual power signals are diplexed to a common antenna with rf signal isolation between the power sources or transmitters.

Figure 2:
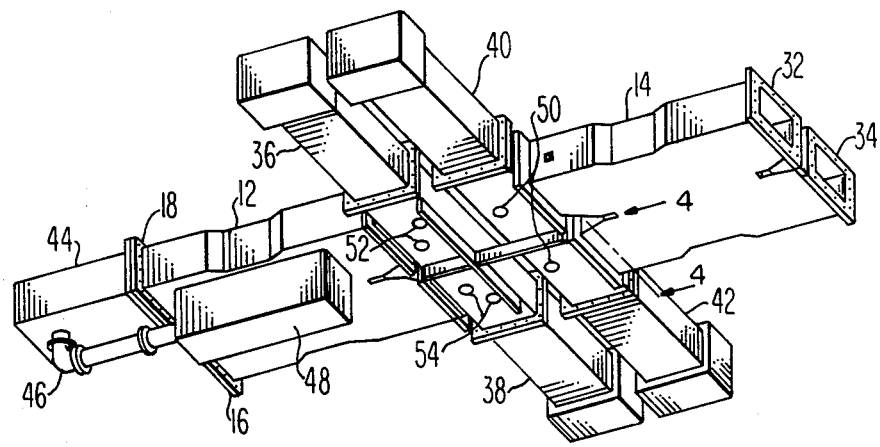
FIG. 2 is a bottom perspective view of the notch diplexer of FIG. 1.

FIG. 2 of the drawings is a bottom perspective view of the aforementioned antenna diplexer 10 for UHF use. As illustrated, the second waveguide port 18 of the first hybrid 12 is coupled to a waveguide-to-coaxial transmission-line adapter 44 which couples energy to a coaxial transmission line 46, which in turn is coupled to a terminating impedance or load 48. The first waveguide port 16 of the first hybrid 12 and the third and fourth waveguide ports 32 and 34 of the second hybrid 14 are open, ready to be coupled to appropriate waveguides. Also shown in FIG. 2 are the ends of probes 50 which aid in coupling the transmission lines 24 and 26 to the aural cavities 40 and 42, and the ends of probe pairs 52 and 54 which aid in coupling to the lower sideband cavities 36 and 38, respectively.

Figure 3:
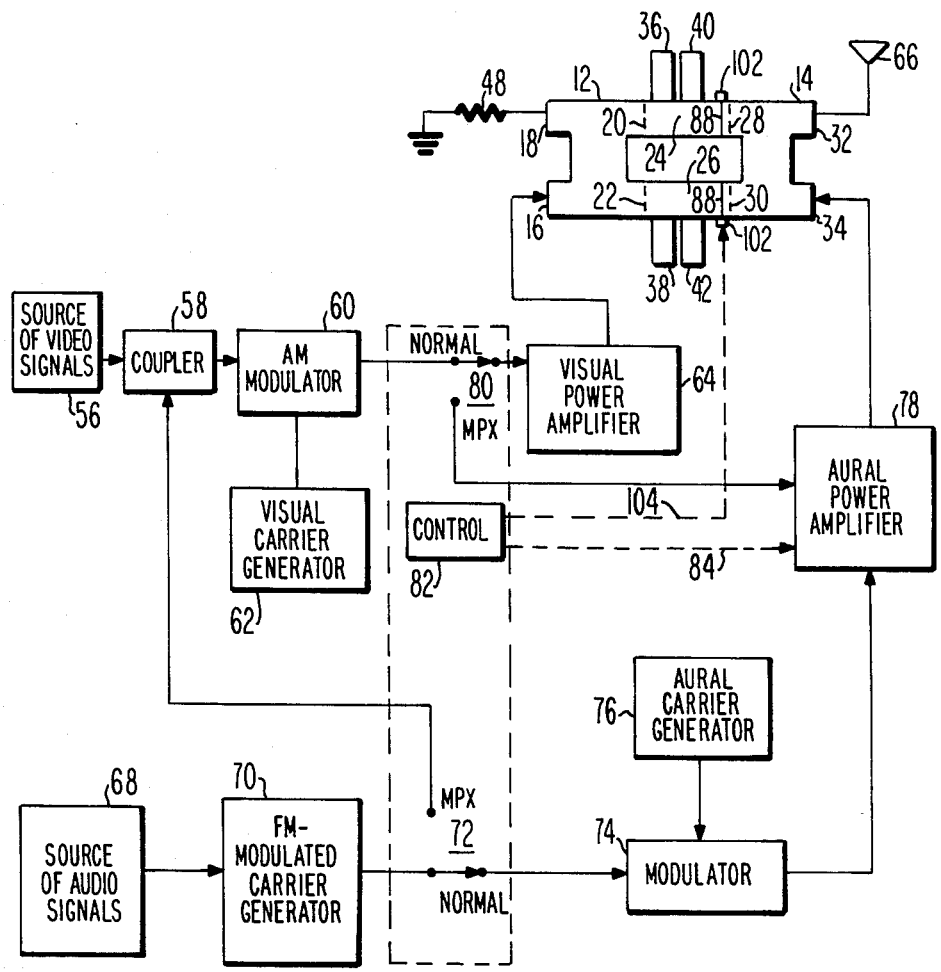
FIG. 3 is a simplified block diagram of a television transmitter using the present invention.

FIG. 3 illustrates a transmitting system. In FIG. 3, a source 56 of video signals is coupled by a coupler 58 to an amplitude modulation (AM) modulator 60, which modulates a visual carrier signal, e.g. at 45.75 MHz, received from a visual carrier generator 62 with the video signal to produce a modulated visual signal. The modulated visual signal is applied through a ganged switch section 80 to a visual power amplifier 64 which produces a visual power signal for application to the first (visual input) port 16 of the first hybrid 12. The second (reject load) port 18 of the first hybrid 12 is coupled to the load 48 illustrated as a resistor, and the third (antenna) port 32 is coupled to a transmitting antenna 66.

A source 68 of audio signals associated with the video signals is coupled to an FM modulator-generator 70 which frequency modulates a carrier at, e.g., 4.5 MHz with the audio information. The resulting FM-modulated signal is coupled by way of a first ganged switch section 72, ganged with switch section 80, to a modulator 74 which up-converts the FM-moduated baseband signal to the appropriate aural carrier frequency, e.g., 41.25 MHz, with the aid of an aural carrier generator 76. The up-converted aural signal is applied to an aural power amplifier 78 for application to the fourth (aural input) port 34 of the second hybrid 14.

In normal operation, the ganged switch sections 72 and 80 are in the position shown, and the high-power modulated aural and visual signals are duplex combined as described in conjunction with FIGS. 1 and 2 for application to the antenna 66. In case of failure of the aural power amplifier 78, the first switch section 72 is either automatically or manually thrown from the NORMAL position to the MPX (multiplex) position. The baseband modulated aural carrier is decoupled from the modulator 74 and the failed aural power amplifier 78 and is coupled instead to the coupler 58, which combines the 4.5 MHz FM-modulated baseband carrier with the baseband video signal for application to the AM modulator 60. The coupler 58 may be no more than a resistive adder circuit for coupling the aural and visual signals to a low-impedance point by way of resistors. This causes the visual power amplifier 64 to amplify a signal which contains not only video but which also contains an audio carrier signal at the proper aural carrier frequency. Simultaneously, the aural cavities 40 and 42 in the diplexer 10 are detuned in order to allow the aural-multiplexed visual carrier to pass through the diplexer 10, as described in U.S. Pat. No. 4,491,871.

In case of failure of the visual power amplifier 64, a second switch section 80 is also either automatically or manually thrown from the NORMAL to the MPX position so that the aural-multiplexed visual carrier is put through the aural power amplifier 78. The first and second switch sections 72 and 80 may be automatically operated through relay operation under the control of a central push-button control console 82. The central control console 82 then also causes the aural power amplifier 78 for the visual carrier frequency to be retuned, illustrated by a first dotted line 84, in order to generate a combined visual and aural power signal from the aural power amplifier 78.

The combined visual and aural power signal enters the fourth (aural input) port 34 of the second hybrid 14 and is fed to point S where it splits into two portions of substantially equal energy. One portion propagates to the left along the second transmission line 26 from the second port 30, and the other portion propagates to the left in the first transmission line 24 from the first port 28 with a 90° relative phase shift. The combined visual and aural power signal is then reflected back to the right towards the second hybrid 14 by shorting means, indicated by reference number 88 in FIG. 3, coupled to the first and the second transmission lines 24 and 26 between the second hybrid 14 and the first hybrid 12. Preferably, the shorting means is disposed between the second hybrid 14 and the aural cavities 40 and 42. After passing through the second hybrid 14 a second time, the combined power signal arrives in phase at the third (antenna) port 32, and arrives 180° out-of-phase at the fourth (aural input) port 34, with a net result of zero voltage reflected to port 34. Thus, the combined visual and aural energy couples to the antenna 66 but is isolated from the aural power amplifier 78.

FIGS. 4a and 4b show the preferred form of shorting means which comprise first and second conductive plates 88 disposed in the paths of the first and the second transmission lines 24 and 26, respectively, so as to electrically contact the wide sidewalls of the respective transmission line which has a rectangularly shaped cross-section. Since the first conductive plate 88 is similar to the second conductive plate 88, only the second plate 88 disposed within the second transmission line 26 is illustrated in FIGS. 4a and 4b. The first and second transmission lines 24 and 26 typically are rectangular waveguides wherein each of the conductive plates 88 comprises a vane rotatably mounted on a shaft 90 inserted through the narrow sidewalls 92 of the respective transmission line and supported by bearings 94. The bearings 94 allow each vane to rotate between a short-circuited position, shown in FIG. 4a, and a normal position when rotated 90 degrees from the short-circuited position, shown in FIG. 4b.

FIGS. 5a and 5b show spring contacts 96 which are attached to the wide sidewalls 98 of the second transmission line 26 by means of narrow acess covers 99. The spring contacts 96 touch the edges 100 of the vanes when rotated to the short-circuited position, as illustrated in FIG. 5a, thereby making effective electrical contact to the edges 100. When the vanes are rotated 90 degrees from the short-circuited position, as illustrated in FIGS. 4b and 5b, a susceptance will be produced which can be matched so that the rf energy will pass through the transmission lines 24 and 26 in a normal manner. The shorting plates 88 may be operated by motors 102, coupled to the shafts 90, which are ganged for operation with the second switch section 80 by the central control console 82, as illustrated by a second dotted line 104 in FIG. 3. The shorting means allows the aural-multiplexed visual carrier to be put through the aural power amplifier 78 to the aural input of the notch diplexer 10, thereby eliminating the need for expensive bypass switching.

Other embodiments of the invention will be apparent to those skilled in the art. For example, the baseband video signals may be directly converted to the proper carrier frequencies by a controllable or modulatable oscillating power device, which would obviate the need for separate modulators and low-level carrier oscillators. Coaxial transmission lines and/or circular waveguides may be used in some or all portions of the system. The filtration for removal of unwanted modulation products may be much more extensive than that shown.

Many mechanical arrangements for the shorting means are possible, including solenoid-operated shorting plates.

What is claimed is:

1. In an antenna diplexer including
    a first four-port hybrid having a first port adapted for coupling to a visual power amplifier generating a visual power signal, from a video signal, at a level suitable for coupling to a transmitting antenna, a second port adapted for coupling to a load, and third and fourth ports coupled to first and second transmission lines, respectively, for splitting said visual power signal into first and second portions which are propagated in said first and said second transmission lines, respectively;
    a second four-port hybrid having first and second ports coupled to said first and said second transmission lines, respectively, for receiving said first and said second portions of said visual power signal and for combining said first and said second portions for propagation to a third port adapted for coupling to said antenna, said second hybrid also having a fourth port, adapted for coupling to an aural power amplifier generating an aural power signal, from an audio signal, at a level suitable for coupling to said antenna, for splitting said aural power signal into first and second portions coupled to said first and said second transmission lines, respectively, and propagated towards said first hybrid; the improvement comprising:
    shorting means coupled to said first and said second transmission lines between said second hybrid and said first hybrid for selectively reflecting back towards said second hybrid a combined visual and aural power signal produced by coupling said aural signal with said visual signal to generate an aural-multiplexed visual signal which is switched through said aural power amplifier.

2. An antenna diplexer as defined in claim 1 wherein said diplexer further includes first and second tuned mismatch generating means coupled to said first and said second transmission lines, respectively, for presenting a mismatch to said first and said second transmission lines at the frequency of said aural power signal for reflecting back, towards said second hybrid, said first and said second portions of said aural power signal whereby said first and said second portions of said aural power signal are combined in said second hybrid and coupled to said third port of said second hybrid, said aural power signal is coupled to said antenna together with said visual power signal, and said visual power amplifier is isolated from said aural power amplifier and is therefore not perturbed, and wherein said shorting means coupled to said first and said second transmission lines is disposed between said second hybrid and, respectively, said first and said second tuned mismatch generating means.

3. An antenna diplexer as defined in claim 2 wherein said first and second transmission lines are rectangular waveguides, and said shorting means comprises a conductive plate which can be selectively disposed across each of said first and said second transmission lines so as to electrically contact the wide sidewalls of the respective transmission line.

4. An antenna diplexer as defined in claim 3 wherein each of said conductive plates comprises a vane rotatably mounted on a shaft inserted through the narrow sidewalls of the respetive transmission line and supported by bearings, said bearings allowing each vane to rotate between a short-circuited position and a normal position when rotated 90 degrees from the short-circuited position.

5. An antenna diplexer as defined in claim 4 wherein the wide sidewalls of said first and said second transmission lines have spring contacts attached thereto for touching the edges of said vanes when rotated to said short-circuited position.

6. An antenna diplexer as defined in claim 5 wherein each of said tuned mismatch generating means comprises a short-circuited third transmission line.

7. An antenna diplexer as defined in claim 6. wherein said visual power signal is a color signal modulated onto a first carrier and includes a color subcarrier at a frequency offset from the frequency of said first carrier, and wherein said diplexer further includes third and fourth reflective tuned mismatch means coupled to said first and said second transmission lines, respectively, said third and said fourth reflective tuned mismatch means being tuned to a frequency below the frequency of said first carrier by the same offset as said color subcarrier is above said first carrier.

8. In a system for coupling signals to a transmitting antenna from a source of television video signals modulated onto a first carrier and from a source of audio signals modulated onto a second carrier at a frequency offset from said first carrier frequency, said system including
    a visual power amplifier coupled to said source of video signals for generating a visual power signal at a power level suitable for coupling to said antenna;
    an aural power amplifier, coupled to said source of audio signals, for generating an aural power signal at a level suitable for coupling to said antenna;
    a first four-port hybrid having a first port adapted for coupling to said visual power amplifier, a second port adapted for coupling to a load, and third and fourth ports coupled to first and second transmission lines, respectively, for splitting said visual power signal into first and second portions which are propagated in said first and said second transmission lines, respectively;
    a second four-port hybrid having first and second ports coupled to said first and said second transmission lines, respectively, for receiving said first and said second portions of said visual power signal and for combining said first and said second portions for propagation to a third port adapted for coupling to said antenna, said second hybrid also having a fourth port, adapted for coupling to said aural power amplifier, for splitting said aural power signal into first and second portions coupled to said first and said second transmission lines, respectively, and propagated towards said first hybrid; and
    emergency coupling means for coupling said audio signals together with said video signals in order to generate a combined aural and visual signal; the improvement comprising:
    emergency switching means for switching said combined visual and aural signal to said aural power amplifier in order to generate a combined visual and aural power signal; and
    shorting means coupled to said first and said second transmission lines between said second hybrid and said first hybrid for selectively reflecting back towards said second hybrid said combined visual and aural power signal.

9. A system as defined in claim 8 wherein said system further includes first and second tuned mismatch generating means coupled to said first and said second transmission lines, respectively, for presenting a mismatch to said first and said second transmission lines at the frequency of said aural power signal for reflecting back, towards said second hybrid, said first and said second portions of said aural power signal whereby said first and said second portions of said aural power signal are combined in said second hybrid and coupled to said third port of said second hybrid, said aural power signal is coupled to said antenna together with said visual power signal, and said visual power amplifier is isolated from said aural power amplifier and is therefore not perturbed, and wherein said shorting means coupled to said first and second transmission lines is disposed between said second hybrid and, respectively, said first and said second tuned mismatch generating means.

10. A system as defined in claim 9 wherein said first and said second transmission lines are rectangular waveguides, and said shorting means comprises a conductive plate which can be selectively disposed across each of said first and said second transmission lines so as to electrically contact the wide sidewalls of the respective transmission line.

11. A system as defined in claim 10 wherein each of said conductive plates comprises a vane rotatably mounted on a shaft inserted through the narrow sidewalls of the respective transmission line and supported by bearings, said bearings allowing each vane to rotate between a short-circuited position and a normal position when rotated 90 degrees from the short-circuited position.

12. A system as defined in claim 11 wherein the wide sidewalls of said first and said second transmission lines have spring contacts attached thereto for touching the edges of said vanes when rotated to said short-circuited position.

13. A system as defined in claim 12 wherein each of said tuned mismatch generating means comprises a short-circuited third transmission line.

14. A system as defined in claim 13 wherein said visual power signal is a color signal including a color subcarrier at a second frequency offset from the frequency of said first carrier, and wherein said system further includes third and fourth reflective tuned mismatch means coupled to said first and said second transmission lines, respectively, said third and said fourth reflective tuned mismatch means being tuned to a frequency below the frequency of said first carrier by the same offset as said color subcarrier is above said first carrier.

* * * * *